*INVENTOR*
MAURICE J. VAN HORN, JR.

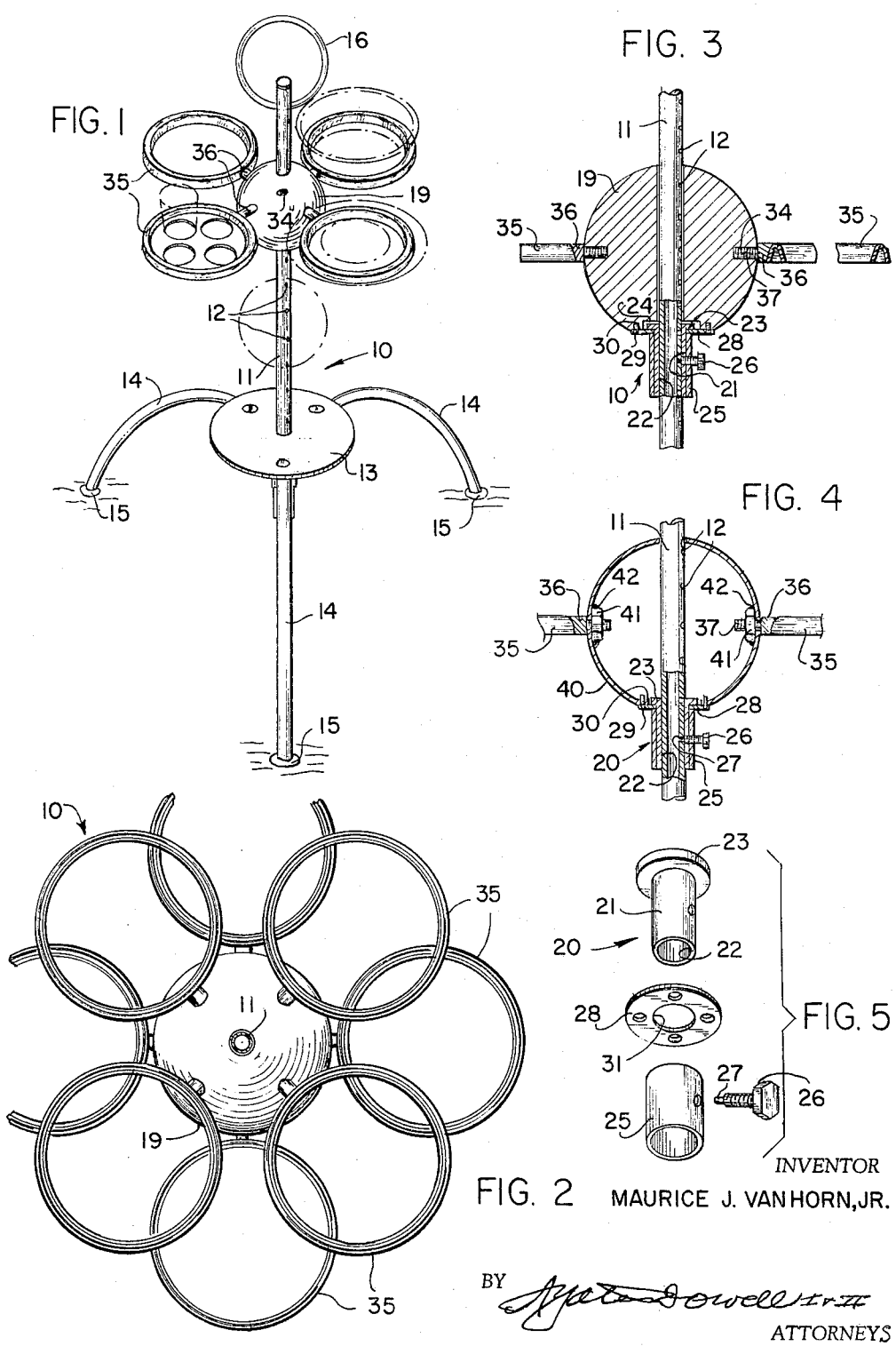

BY
*ATTORNEYS*

United States Patent Office 3,283,913
Patented Nov. 8, 1966

3,283,913
PORTABLE ROTATABLE FOOD SERVER
Maurice J. Van Horn, Jr., Rte. 2, box 236, Church Road, Reisterstown, Md.
Filed Oct. 2, 1964, Ser. No. 401,034
3 Claims. (Cl. 211—78)

This invention relates to the serving or dispensing of foods, beverages and the like, including on lawns, patios, and other out-of-door places, as well as indoors, and to apparatus and eqiupment for supporting holders or containers of such substances in a manner that they will be conveniently accessible at all times.

The invention relates particularly to a portable stand or carrier on which holders of various kinds may be mounted for supporting trays, serving dishes, baskets or other containers for substances of various kinds and at a convenient height and location for ready availability.

This invention is an improvement over my co-pending application, Serial No. 320,570 now Patent No. 3,194,403.

Heretofore, various devices have been provided for holding food, refreshments, or other substances, including trays or containers for tidbits, beverages, foodstuffs or the like; however, these have been expensive, complicated, bulky, difficult to apply and remove or handle, and easy to upset. The invention of application 320,570 overcame many of the criticisms of prior devices but the device of such application did not accomplish all that is desired because of its appearance, its difficulty of manufacture and its was limited in the number of containers it could accommodate.

It is an object of the invention to provide a portable rotatable food server having a supporting member with a plurality of holders rotatably mounted on an upright shaft at varying elevations and adapted to contain a widely diversified selection of dishes, glasses, trays, or other containers of various shapes and sizes used in the serving and dispensing of food.

Another object of the invention is to provide a portable stand having an article support member rotatably mounted thereon and such support member being vertically adjustable along said stand in a manner that the finish of the upright post will not be marred when the support member is rotated.

Other objects and advantages of the invention will be apparent from the following description taken in conjunction with the accompanying drawings in which:

FIG. 1 is a perspective illustrating one application of the invention;

FIG. 2 an enlarged top plan view thereof;

FIG. 3 an enlarged vertical section of the support member of FIG. 1 and illustrating the means for mounting said member on the vertical post;

FIG. 4 a view similar to FIG. 3 of a slightly modified support member;

FIG. 5 an exploded perspective of the rotatable support means.

Figure 6:
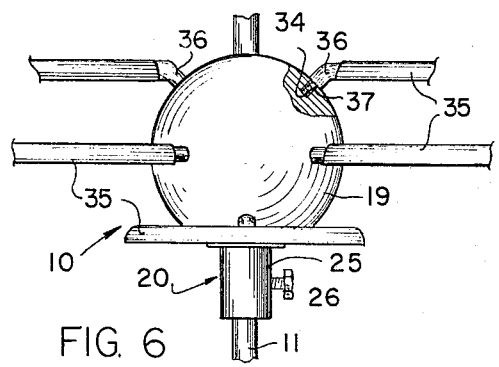
Figure 7:
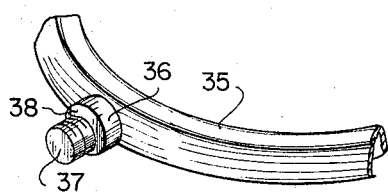
Figure 8:
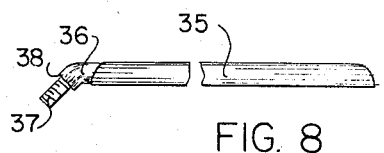
Figure 9:
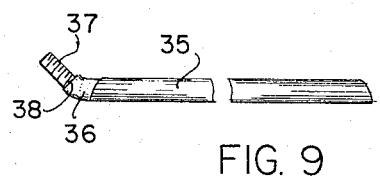
Figure 10:
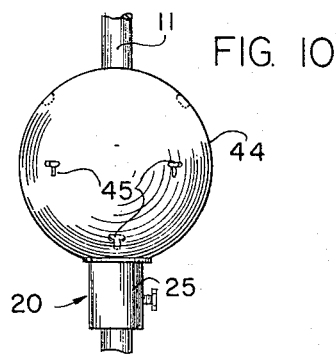
Figure 12:
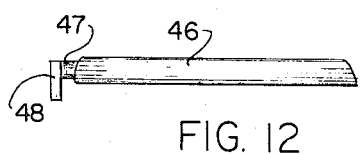
Figure 11:
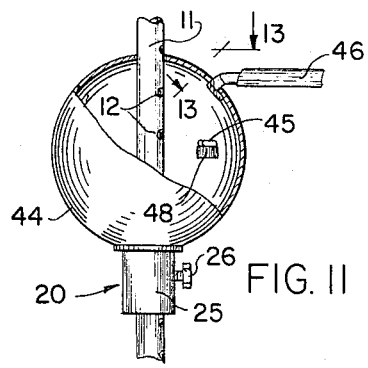
Figure 13:
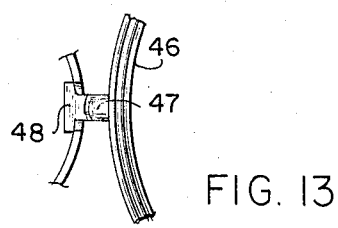

FIG. 6 an enlarged side elevation illustrating the support member in use;

FIG. 7 an enlarged fragmentary perspective of a tray holder illustrating the attaching means therefor;

FIGS. 8 and 9 side elevations on a reduced scale illustrating slightly modified holders;

FIG. 10 a side elevation of a further modified support member;

FIG. 11 a vertical section of a modification of FIG. 10;

FIG. 12 a side elevation of a holder illustrating attaching means for attaching the holder to the support member of FIG. 10; and, FIG. 13 an enlarged fragmentary section on the line 13—13 of FIG. 11.

Briefly stated the present invention is an improvement over my co-pending application Serial No. 320,570 and includes a portable stand having an upright post with a support member rotatably mounted thereon, such support member being adjustable lengthwise of the post and being adapted to be secured in fixed adjusted position while being freely rotatable in any adjusted position, such support member having the shape of a ball or sphere and adapted to support a plurality of holders spaced about the surface thereof at different elevations for holding trays, dishes, glasses or other containers of food or the like in a manner that the support member can be rotated to locate any container of food in any desired position for the easy removal of its contents.

With continued reference to the drawings a stand 10 is provided which includes a generally vertical post 11 with a series of spaced openings 12 along the length thereof. A plate 13 is connected to one end of the post and such plate has attached a plurality of legs 14 each of which has an adjustable foot 15 of conventional construction for conforming to the contour of the ground. The upper portion of the post 11 is provided with a handle 16 which may be in the form of a ring for moving the stand from place to place as desired.

A support member 19 is rotatably mounted on the post 11 and is adjustable along the length thereof. The support member is in the shape of a ball or sphere and may be solid as illustrated in FIG. 3 or hollow as illustrated in FIG. 4. The support member 19 is rotatably supported by an adjustable bushing 20 including an inner sleeve 21 having a bore 22 of a size to be slidably received on the post 11 and having an upper flange 23 receivable within a recess 24 in the support member 19. An outer sleeve 25 is slidably mounted on the lower portion of the inner sleeve 21 with the upper end of such outer sleeve being in spaced relation to the flange 23 of such inner sleeve. The outer sleeve and inner sleeve are connected together by a fastener 26 having a reduced projection 27 on its free end of a size to be received within the openings 12 in the post. A bearing ring 28 is connected by fasteners 29 to a flattened portion 30 on the support member 19 and such bearing ring has a central opening 31 of a diameter slightly greater than the inner sleeve 21. The inner sleeve 21 is received within the opening 31 and the bearing ring 28 rests on the upper edge of the outer sleeve 25 so that the support member 19 is freely rotatable thereon.

As illustrated in FIGS. 1, 2, 3 and 6, the solid support member 19 is provided with a plurality of threaded openings 34 disposed about its periphery at different elevations and each of such openings is adapted to support a holder 35 in the form of a ring for supporting dishes, trays or other containers for food and the like. Each of the holders is provided with an outwardly extending projection 36 having a reduced threaded extension 37 for engaging the threads of the openings 34. A shoulder 38 is formed between the projection 36 and the reduced extension 37 and such shoulder is adapted to bear against the support member 19 when the threaded extension 37 is fully inserted in the openings 34 and the holder 35 is in substantially level position. As illustrated in FIGS. 7–9 the holders are mounted in the central portion of the support member and have projections extending outwardly substantially in the same plane as the holder and the holders which are to be mounted above or below the central portion are adapted to have offset projections so that the holders will be generally level when in position.

With reference to FIG. 4, a modified support member 40 is provided and includes a hollow ball or sphere having nuts or other internally threaded elements 41 connected to the inner periphery by welding 42 or the like.

With reference to FIGS. 10–13, a further modified supporting structure is disclosed and includes a spherical support member 44 rotatably mounted on the post 11 and such support member has a plurality of T-shaped bayonet-type slots 45 for the reception of holders 46. Each of the holders 46 has a projection 47, which may be straight or angled up or down depending upon the position of use, and each projection has a tongue or bar 48 receivable in the upper portion of the slots 45 so that the tongues may be inserted in the slots and thereafter moved downwardly and be locked in position.

In the operation of the device, the holders 35 or 46 are mounted on a cooperating support member 19, 40 or 44 after which the fastening element 26 is loosened or removed so that the projection 27 no longer is received within one of the openings 12 in the post 11. The adjustable bushing 20 with the support member mounted thereon can be adjusted lengthwise of the post so that the support member can be located at a desired elevation. The fastening element 26 is then reapplied to maintain the support member in the desired position by means of projection 27 being received within one of the openings 12.

Thereafter, dishes or other containers may be placed on the holders and the support member may be rotated to move any container to a position adjacent to a person dispensing material from such container.

It will be apparent that a relatively simple portable stand is provided with a spherical support member adjustably and rotatably mounted thereon and such support member is adapted to carry a plurality of removable holders disposed about the periphery thereof in several different planes so that the sphere may be rotated to locate a selected holder in a selected position.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. A portable rotatable food server comprising a stand having a generally upright post, said post having a series of openings spaced along the length thereof, a spherical support member rotatably mounted on said post, adjusting means for adjusting the vertical position of said support member on said post, said adjusting means including a bushing having an inner sleeve slidably mounted on said post, an upper flange on said inner sleeve, an outer sleeve slidably mounted on the lower portion of said inner sleeve, the upper portion of said outer sleeve being in spaced relation to said flange, a bearing ring connected to said support member and adapted to rest upon the upper edge of said outer sleeve and be rotatably supported thereby, means carried by said sleeves to engage a selected one of said holes and a plurality of holders mounted about the periphery of said support member in at least two vertical planes.

2. A portable rotatable food server comprising a stand having a generally upright post, a support member rotatably mounted on said post, adjusting means for adjusting the vertical position of said support member on said post, a plurality of holders mounted about the periphery of said support member in at least two vertical planes, said adjusting means including a first sleeve slidably mounted on said post, a second sleeve carried by said first sleeve, bearing ring means connectable to said support member and rotatably supported by said second sleeve, and means carried by said sleeves to lock said slidable sleeves in a selected position on said post, whereby said support member can be vertically adjusted along said post and is rotatably supported by said second sleeve.

3. A portable rotatable food server comprising a stand having a generally upright post, a support member rotatably mounted on said post, at least one holder mounted on said support member, adjusting means for adjusting the vertical position of said support member on said post, said adjusting means including a first sleeve slidably mounted on said post, a second sleeve carried by said first sleeve, bearing ring means connectable to said support member and rotatably supported by said second sleeve, and means carried by said sleeves to lock said slidable sleeves in a selected position on said post, whereby said support member can be vertically adjusted along said post and is rotatably supported by said second sleeve.

References Cited by the Examiner

UNITED STATES PATENTS

| 113,035 | 3/1871 | Erkson | 211—77 |
| 361,267 | 4/1887 | Conn | 211—95 |
| 494,704 | 4/1893 | Hansen | 211—78 |
| 536,971 | 4/1895 | Sullivan | 211—166 |
| 2,595,901 | 5/1952 | Sperring | 248—415 |
| 2,970,701 | 2/1961 | Fetter | 211—78 |
| 3,035,707 | 5/1962 | Thompson | 211—78 |

CLAUDE A. LE ROY, *Primary Examiner.*

FRANK L. ABBOTT, CHANCELLOR E. HARRIS,
*Examiners.*

R. P. SEITTER, *Assistant Examiner.*